United States Patent [19]

Nolte et al.

[11]  4,417,036
[45]  Nov. 22, 1983

[54] PROCESS FOR THE POLYMERIZATION OF CHLOROPRENE

[75] Inventors: Wilfried Nolte, Leverkusen; Heinz Esser, Burscheid, both of Fed. Rep. of Germany

[73] Assignee: Bayer Aktiengesellschaft, Leverkusen, Fed. Rep. of Germany

[21] Appl. No.: 356,019

[22] Filed: Mar. 8, 1982

[30] Foreign Application Priority Data

Mar. 21, 1981 [DE] Fed. Rep. of Germany ....... 3111138

[51] Int. Cl.³ .............................................. C08F 2/22
[52] U.S. Cl. .................................... 526/211; 526/295; 524/552
[58] Field of Search ................. 526/211, 295; 524/552

[56] References Cited

U.S. PATENT DOCUMENTS 3,222,334 12/1965 Demme ................................. 526/83
3,878,181 4/1975 Mayer-Mader et al. ........... 526/295

Primary Examiner—Joseph L. Schofer
Assistant Examiner—Bernard Lipman
Attorney, Agent, or Firm—Connolly and Hutz

[57] ABSTRACT

High-solids polychloroprene latices are obtained by polymerizing chloroprene, which may contain up to 50%, by weight, of a copolymerizable monomer, in aqueous alkaline emulsion containing emulsifiers and other conventional auxiliaries in the presence of from 0.1 to 2%, by weight, of a primary or secondary hydroxyalkylamine in which the OH-group is separated from the amino nitrogen atom by at least two carbon atoms, polymerization being carried out to a conversion of more than 80%.

6 Claims, No Drawings

PROCESS FOR THE POLYMERIZATION OF CHLOROPRENE

This invention relates to an improved process for the production of polychloroprene latices by polymerisation to high conversion levels, generally in excess of 50%.

To produce high-solids polychloroprene latices in particular, polymerisation has to be carried out to very high conversion levels. However, it may also be advantageous on economic grounds to aim at high conversions in the production of latices of relatively low concentration.

In the emulsion polymerisation of high-solids polychloroprene latices, there are above all two difficulties to be overcome. If, in the formulation normally used for an approximately 35% latex, the water content is reduced to such an extent that an approximately 60% latex would be formed, the reaction velocity is reduced (in general, the reaction comes to a standstill if the conversion is moderate) and the viscosity of the reaction mixture increases to drastically that satisfactory stirring and satisfactory dissipation of the heat of polymerisation are impossible. Because of this, it is also not possible to terminate polymerisation in the usual way at a conversion level of from 60 to 70%. The water content of the reaction mixture would be too low and the viscosity too high. Accordingly, in the direct polymerisation of high-solids latices, the reaction is continued to a conversion of more than 85%, depending on the necessary solids concentration.

In the polymerisation of chloroprene, the number of chain branchings increases with increasing conversion so that, beyond a certain conversion level, the polymer contains insoluble fractions. The insoluble fraction (gel) content and the conversion level at which it begins to form depend upon the polymerisation temperature and upon the type and quantity of molecular weight regulator used.

For certain applications, for example adhesives, the polymer has to be gel-free. By contrast, there are other applications which require a high gel content. However, even with these gel-containing latices, which are generally produced at elevated temperature using small quantities of regulator, a relatively high conversion level results unfavourably in poor tensile strength of the films produced from the latex on account of the relatively large number of branching points.

Solutions have been proposed to the problem of avoiding gel formation where polymerisation is carried out to high conversion levels. Thus, the polymerisation of chloroprene in the presence of from 0.05 to 1.0%, by weight, of a tertiary amine containing polyether chains (DE-OS No. 2,514,666) or in the presence of from 0.05 to 1.0%, by weight, of a polyether (DE-OS No. 2,527,320), based in each case on the quantity of monomer, is said to give gel-free polymers providing the polymerisation reaction is carried out at 40° C. up to a conversion of 85% using approximately 0.28%, by weight, of dodecyl mercaptan as regulator.

These proposed methods cannot be successfully applied to gel-containing polychloroprene latices. In addition, the polyether acts as a non-ionic emulsifier and would undesirably affect the colloidochemical properties of the latex.

It has now been found that the addition of an alkanolamine in the polymerisation of chloroprene leads to a latex which, even with conversions exceeding 90%, still forms films characterised by outstanding tensile strength.

Accordingly, the present invention relates to a process for the polymerisation of chloroprene, which may contain up to 50%, by weight, of a copolymerisable monomer, in aqueous alkaline emulsion containing emulsifiers and other conventional auxiliaries, polymerisation being carried out to a conversion of more than 80%, characterised in that an emulsion containing from 0.1 to 2%, by weight, of a primary or secondary hydroxyalkylamine, in which the OH-group is separated from the amino nitrogen atom by at least two carbon atoms, is used. The percentage quoted, like all the following percentages, by weight, of substances used, is based on the quantity of monomer.

The hydroxyalkylamines used are preferably 2-hydroxyalkylamines, more preferably those corresponding to the following general formula:

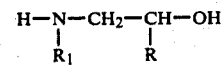

wherein
R represents hydrogen or $C_1$–$C_3$ alkyl; and
$R_1$ represents hydrogen, $C_1$–$C_5$ alkyl or $CH_2$—CHR—OH; most preferably diethanolamine.

Suitable comonomers are, for example, 2,3-dichlorobutadiene, aromatic vinyl compounds, such as styrene, (meth)-acrylonitrile or butadiene.

To obtain solids contents of from 50 to 65%, by weight, the polymerisation mixture must contain from 55 to 90%, by weight, of water and the polymerisation reaction must be carried out to a conversion of more than 90%. The unreacted monomers are removed from the latex by stripping with steam or by thorough stirring in vacuo.

Polymerisation is carried out by known methods, such as batch or inflow processes, but preferably continuously, in the form of emulsion polymerisation. The aqueous phase preferably contains from 2.8 to 3.8%, by weight, more preferably from 3.2 to 3.6%, by weight, of disproportionated abietic acid, from 0.3 to 2.0%, by weight, preferably from 0.5 to 0.7%, by weight, of formaldehyde condensate of naphthalene sulphonic acid and from 0.25 to 0.75%, by weight, preferably from 0.4 to 0.6%, by weight, of a phosphate of polyphosphate as well as from 0.3 to 1.2%, by weight, of an alkali metal hydroxide so that, on completion of polymerisation, the polymerisation mixture has a pH of from approximately 11 to 13. The alkali metal ions introduced with the above-mentioned auxiliaries, emulsifiers and phosphate, must consist at least partly of potassium. A proportion of from approximately 5 to 20 mval per 100 g of chloroprene may be regarded as adequate.

Small quantities of other anionic or non-ionic emulsifiers may additionally be present.

The alkali metal hydroxide used may be sodium hydroxide where potassium salts of the emulsifiers and/or phosphates are simultaneously used. However, it is preferred to work with sodium salts of the emulsifiers and phosphates and to use potassium hydroxide for adjusting the pH.

The phosphates used may be alkali metal salts of ortho-phosphoric acid, diphosphoric acid or hexametaphosphoric acid.

Polymerisation is initiated and maintained using conventional initiators, preferably with formamidine sulphinic acid in the form of a from 1.0 to 2.5%, by weight, aqueous solution. The necessary quantity will depend upon the polymerisation process used and generally amounts to from 3.0%, by weight, (continuous process) to 10.0%, by weight, (batch process) in the case of a 2.5%, by weight, solution.

The properties of the polymer may be adjusted or modified as required by the presence during polymerisation of modifying agents, such as alkyl mercaptans, sulphur or dialkyl xanthogen disulphides.

The polychloroprene latices according to the present invention may be produced in batches or continuously, as in known emulsion polymerisation processes.

Polymerisation may be completely carried out in batches, in which case all the monomer(s) is emulsified in the aqueous emulsifier solution and the polymerisation reaction is initiated and maintained by addition of the initiator. The initiator is added in batches or, preferably, continuously.

It is advantageous, particularly in the polymerisation of large quantities, to begin polymerisation with some of the monomer(s) and the aqueous emulsifier solution and to add the rest of the monomer(s) and the emulsifier solution as the reaction progresses.

Polymerisation is carried out at from 10° to 60° C., preferably from 30° to 55° C. The conventional conditions for emulsion polymerisation, such a stirring to maintain dispersion, homogenisation and the complete displacement of atmospheric oxygen by an inert gas, such as nitrogen, are maintained. Polymerisation is carried out to conversions of more than 80%, preferably to conversions of from 90 to 98%, and then terminated by cooling or stopping with a radical inhibitor, such as diethyl hydroxylamine, or by immediate demonomerisation, for example by stripping with steam. Demonomerisation is carried out in any event. The final latex will also be filtered to separate even traces of precipitates. Antiagers may optionally be added to the latex.

The process according to the present invention is particularly suitable for the continuous production of polychloroprene latex. In addition to economic advantages, continuous production also affords technical advantages. Dissipation of the heat of polymerisation is particularly problematical on account of the reactivity of chloroprene and its high concentration in the reaction mixture. Reactors in the form of large stirrer-equipped vessels of the type used for batch polymerisation generally have unfavourable surface-to-volume ratios which are inadequate for the dissipation of heat. Although possible, batch polymerisation with continuous inflow of the reaction mixture adapted to the dissipation of heat is not preferred on account of the uneconomic utilisation of the vessel capacity and a residence time for some of the latex particles which is longer than the time required for complete conversion. Where polymerisation is carried out continuously in a cascade of vessels, these disadvantages may be avoided or at least greatly reduced. The individual vessels in the cascade are considerably smaller than the single vessel used for batch polymerisation so that the heat of polymerisation may be safely dissipated.

To determine tensile strength, a latex mixture is prepared from a quantity of latex containing 100 g of polymer solids and a dispersion of 7.5 g of active zinc oxide, 2.0 g of diphenyl thiourea and 1.0 g of diphenyl guanidine in 18.5 g of a 5%, by weight, aqueous solution of formaldehyde condensate of sodium naphthalene sulphonate. A 1 mm thick film is prepared from this latex mixture by the "clay plate method" (drying the latex mixture in a clay plate at room temperature).

Tensile strength is measured on a size 1 standard test bar according to DIN 53 504 and should amount to at least 17.0 MPa. Tensile strengths above 18 MPa count as good.

The Defo-value is determined in accordance with DIN 53 514 and Shore hardness in accordance with DIN 53 505.

Other properties, such as HCl-elimination and colloidochemical stability, are affected only slightly, if at all, by the measures according to the present invention.

EXAMPLE 1

A solution of 50.0 g of water, 5 g of 70%, by weight, disproportionated abietic acid, 0.65 g of the formaldehyde condensate of naphthalene sulphonic acid, 0.9 of potassium hydroxide, 0.5 g of sodium hexametaphosphate and 0.5 g of diethanolamine is introduced with 100 g of chloroprene and 0.05 g of dodecyl mercaptan into a reaction vessel equipped with a stirrer, reflux condenser, dropping funnel and nitrogen inlet and outlet. The air present in the vessel is displaced by nitrogen and the temperature raised to 45° C.

A 2.5%, by weight, aqueous formamidine sulphinic acid solution is added dropwise in such a way that a uniform polymerisation reaction takes place. After 4.5 hours, by which time 10 g of the formamidine sulphinic acid solution have been consumed, a conversion of 95.5% is reached. The polymerisation reaction is terminated by cooling. A precipitate-free latex having a pH of 13.0 is obtained. The unreacted chloroprene is removed by gentle distillation in vacuo. The solids content amounts to 58.7%.

Further Examples and Comparison Examples with technical data are shown in Tables 1 and 2. The tests were carried out in the same way as described in Example 1.

TABLE 1

| Example No. | 1 | 2 | 3 | 4 | 5 |
|---|---|---|---|---|---|
| Water | 50.0 | 50.0 | 50.0 | 50.0 | 50.0 |
| Disprop. abietic acid | 3.5 | 3.5 | 3.5 | 3.5 | 3.5 |
| Formaldehyde condensate of naphthalene sulph. acid | 0.65 | 0.65 | 0.65 | 0.65 | 0.65 |
| Potassium hydroxide | 0.9 | 0.9 | 0.9 | 0.9 | —* |
| Sodium hexametaphosphate | 0.5 | 0.5 | 0.5 | 0.5 | 0.5 |
| Diethanolamine | 0.5 | 0.5 | 0.5 | 0.5 | 1.2 |
| Chloroprene | 100.0 | 100.0 | 95.0 | 100.0 | 100.0 |
| 2,3-dichlorobutadiene | — | — | 5.0 | — | — |
| Dodecyl mercaptan | 0.045 | 0.045 | 0.045 | 0.045 | 0.045 |
| 2.5% formamidine sulphinic acid | 10.0 | 10.0 | 13.0 | 11.8 | 10.0 |
| Polymerisation temp. (°C.) | 45 | 40 | 35 | 30 | 45 |

TABLE 1-continued

| Example No. | 1 | 2 | 3 | 4 | 5 |
|---|---|---|---|---|---|
| Polymerisation time (h.) | 4.5 | 4.5 | 4.5 | 5.0 | 5.0 |
| Conversion (%) | 95.5 | 98.0 | 96.5 | 96.4 | 96.9 |
| Solids content (%) | 58.7 | 59.2 | 58.4 | 59.7 | 62.0 |
| Precipitates | none | none | none | none | minimal |
| pH | 13.0 | 13.0 | 12.8 | 13.1 | 10.5** |
| Gel content in toluene (%) | 92 | 90 | 90 | 82 | 87 |
| Defo-value | 6250/46 | 6150/45 | 6000/47 | 5600/46 | 7000/49 |
| Shore hardness at −5° C. (°Sh) | 44 | 44 | 45 | 37 | 45 |
| Strength (MPa)*** | 21.9/20.8 | 27.2/21.9 | 26.2/22.5 | 23.8/24.2 | 20.0/20.7 |

*pH maintained above 11 during polymerisation by the addition of 20% KOH
**pH adjusted to 12.0 with 20% KOH before further processing
***values after vulcanisation for 30/40 mins.

TABLE 2

| Example No. | 6 | 7 | 8* | 9* | 10* | 11* |
|---|---|---|---|---|---|---|
| Water | 50.0 | 50.0 | 50.0 | 50.0 | 50.0 | 50.0 |
| Disprop. abietic acid | 3.5 | 3.5 | 3.5 | 3.5 | 3.5 | 3.5 |
| Formaldehyde condensate of naphthalene sulph. acid | 0.65 | 0.65 | 0.65 | 0.65 | 0.65 | 0.65 |
| Potassium hydroxide | 0.9 | 0.9 | 0.9 | 0.9 | 0.9 | 0.9 |
| Sodium hexametaphosphate | 0.5 | 0.5 | 0.5 | 0.5 | 0.5 | 0.5** |
| Bis-(2-hydroxyethyl)-oleyl-amine | — | — | — | 0.5 | — | — |
| Benzyl phenyl phenol (14 EO) | — | — | — | — | 0.25 | — |
| Isononyl phenol (10 EO) | — | — | — | — | — | 0.2 |
| Ethanolamine | 0.5 | — | — | — | — | — |
| 2-methylaminoethanol | — | 0.5 | — | — | — | — |
| Chloroprene | 100.0 | 100.0 | 100.0 | 100.0 | 100.0 | 100.0 |
| Dodecyl mercaptan | 0.045 | 0.045 | 0.045 | 0.045 | 0.045 | 0.1 |
| 2.5% formamidine sulphinic acid | 8.0 | 8.0 | 10.0 | 10.0 | 10.0 | 21.0 |
| Polymerisation temp (°C.) | 45 | 45 | 45 | 45 | 45 | 44 |
| Polymerisation time (h.) | 3.0 | 3.0 | 4.0 | | | 3.5 |
| Conversion (%) | 95.0 | 95.5 | 96.5 | no reaction | no reaction | 92.5 |
| Solids content (%) | 59.9 | 60.1 | 59.9 | | | 53.1 |
| Precipitates | none | none | none | | | none |
| pH | 13.1 | 13.1 | 12.9 | | | 12.3 |
| Gel content in toluene (%) | 87 | 90 | 93 | | | |
| Defo value | 7800/52 | 7600/52 | 7050/47 | | | 2600/43 |
| Shore hardness at −5° C. (°Sh) | 45 | 45 | 41 | | | 45 |
| Strength (MPa)*** | 19.4/21.1 | 19.3/20.8 | 17.0/17.1 | | | 15.4/16.5 Polymerisation begins with difficulty. Initiator consumption too high |

*Comparison
**Trisodium phosphate
***Values after vulcanisation for 30/40 minutes

We claim:

1. A process for the polymerisation of chloroprene, which may contain up to 50%, by weight, of a copolymerisable monomer, in aqueous alkaline emulsion containing emulsifiers and other conventional auxiliaries, polymerisation being carried out to a conversion of more than 80%, characterised in that the emulsion used contains from 0.1 to 2%, by weight, based on the quantity of monomers, of a primary or secondary hydroxyalkylamine in which the OH-group is separated from the amino nitrogen atom by at least two carbon atoms.

2. A process as claimed in claim 1, characterised in that 2,3-dichloro-butadiene, styrene, (meth)acrylonitrile or butadiene is used as comonomer.

3. A process as claimed in claim 1, characterised in that from 5 to 20 mvals of potassium ions are present in the reaction mixture per 100 g of chloroprene.

4. A process as claimed in claim 1, characterised in that a 2-hydroxyalkylamine is used.

5. A process as claimed in claim 1, characterised in that there is used a hydroxyalkylamine corresponding to the following general formula:

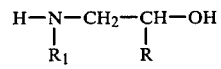

wherein

R represents hydrogen or $C_1$-$C_3$ alkyl; and $R_1$ represents hydrogen, $C_1$-$C_5$ alkyl or $CH_2$—CHR—OH.

6. A process as claimed in claim 1, characterised in that diethanolamine is used as the hydroxyalkylamine.

* * * * *